US012808324B2

(12) United States Patent
Cronin et al.

(10) Patent No.: US 12,808,324 B2
(45) Date of Patent: Nov. 24, 2026

(54) AIRCRAFT ENGINE ENTRAINED PARTICLE SEPARATION SYSTEM AND METHOD

(71) Applicant: RTX Corporation, Farmington, CT (US)

(72) Inventors: Dennis P. Cronin, Lebanon, CT (US); Anthony R. Bifulco, Ellington, CT (US)

(73) Assignee: RTX Corporation, Farmington, CT (US)

( * ) Notice: Subject to any disclaimer, the term of this patent is extended or adjusted under 35 U.S.C. 154(b) by 220 days.

(21) Appl. No.: 18/389,096

(22) Filed: Nov. 13, 2023

(65) Prior Publication Data

US 2025/0154896 A1 May 15, 2025

(51) Int. Cl.
*F02C 7/052* (2006.01)
*B64D 33/02* (2006.01)

(52) U.S. Cl.
CPC .............. *F02C 7/052* (2013.01); *B64D 33/02* (2013.01)

(58) Field of Classification Search
CPC .... F02C 7/052; F02C 7/04; F02C 7/05; F02C 7/057; F02C 7/1435; B64D 33/02; B64D 2033/0226; B64D 2033/0246; B64D 2033/0233; F01D 25/002; F01D 25/02
See application file for complete search history.

(56) References Cited

U.S. PATENT DOCUMENTS

| | | | | |
|---|---|---|---|---|
| 4,070,827 | A | 1/1978 | Vanfleet | |
| 7,802,760 | B2 * | 9/2010 | Webster | F02C 7/04 244/207 |
| 9,845,728 | B2 | 12/2017 | Brown | |
| 9,874,228 | B2 | 1/2018 | Brown | |
| 2014/0190347 | A1 | 7/2014 | Wong | |
| 2017/0204739 | A1 * | 7/2017 | Rawson | B08B 3/10 |
| 2017/0369174 | A1 | 12/2017 | Deladriere | |
| 2020/0040763 | A1 * | 2/2020 | Wang | B08B 9/00 |
| 2020/0131928 | A1 * | 4/2020 | Saenz | B08B 3/10 |

(Continued)

FOREIGN PATENT DOCUMENTS

| | | | | |
|---|---|---|---|---|
| CN | 106014637 B | | 12/2017 | |
| EP | 599502 A | | 6/1994 | |
| EP | 0599502 A1 | * | 6/1994 | B64C 21/06 |

OTHER PUBLICATIONS

EP Search Report for EP Patent Application No. 24212787.6 dated Apr. 7, 2025.

*Primary Examiner* — Andrew H Nguyen
(74) *Attorney, Agent, or Firm* — Getz Balich LLC

(57) ABSTRACT

A method of removing particles entrained within an air flow that has entered a turbine engine disposed within a nacelle is provided. The turbine engine includes fan, compressor, and turbine sections, a bypass duct, and an axial centerline. The bypass duct is disposed radially outside of a core gas path. A nacelle includes a nacelle inlet cavity that defines an air inlet path into the engine. The method includes providing a fluid injection system that injects fluid into the air inlet path from nozzles, and controlling the fluid injection system to inject the fluid into the air inlet path from the nozzles during a segment of an aircraft flight mission. Particles wetted by the injected fluid are subject to centrifugal force in and aft of the fan section and are directed radially outward for flow through the bypass duct.

18 Claims, 12 Drawing Sheets

(56) References Cited

U.S. PATENT DOCUMENTS

| | | | | |
|---|---|---|---|---|
| 2020/0157969 | A1* | 5/2020 | Park | F01D 25/002 |
| 2020/0291855 | A1 | 9/2020 | Koka | |
| 2020/0386107 | A1* | 12/2020 | Hoisington | F01D 9/04 |
| 2021/0317752 | A1* | 10/2021 | Deja | B08B 3/024 |
| 2021/0332764 | A1* | 10/2021 | Saripella | F02C 6/08 |
| 2023/0060010 | A1 | 2/2023 | Sibbach | |
| 2023/0166869 | A1* | 6/2023 | Albet | B64F 5/30<br>134/18 |

* cited by examiner

Typical Flight Mission Diagram

AIRCRAFT ENGINE ENTRAINED PARTICLE SEPARATION SYSTEM AND METHOD

BACKGROUND OF THE INVENTION

1. Technical Field

The present disclosure relates to aircraft engines in general and to aircraft including mechanisms for removing entrained particles from an engine in particular.

2. Background Information

Particles of various materials such as sand and dust and chemicals that enter a turbine engine can be harmful, for example potentially causing component surface erosion and/or corrosion, clogging of cooling holes and passages, to name a few. Particulate contamination primarily occurs at takeoff and landing due to the higher concentration of dirt particles near the ground. Typically, particles are only cleaned from the surfaces of the nacelle and the engine components, which leaves particles in the air that pass into the turbine engine. What is needed is an improved system for removing entrained particles from air passing within an aircraft turbine engine.

SUMMARY

According to an aspect of the present disclosure, a method of removing particles entrained within an air flow that has entered a turbine engine disposed within a nacelle is provided. The turbine engine includes a fan section, a compressor section, a turbine section, and a bypass duct arranged along an axial centerline. The compressor and turbine sections are in communication with a core gas path. The bypass duct is disposed radially outside of the core gas path. The nacelle includes a nacelle inlet cavity disposed forward of the fan section. The nacelle inlet cavity defines an air inlet path into the turbine engine. The method includes providing a fluid injection system configured to inject a fluid into the air inlet path from a plurality of nozzles in communication with nacelle inlet cavity, and controlling the fluid injection system to inject the fluid into the air inlet path from the plurality of nozzles during at least one predetermined segment of an aircraft flight mission. The aircraft flight mission includes an idling segment, a taxiing segment, a take-off segment, an ascent segment, a descent segment, and a landing segment. Particles wetted by the injected fluid are subject to centrifugal force in and aft of the fan section and are directed radially outward for flow through the bypass duct.

In any of the aspects or embodiments described above and herein, the step of controlling the fluid injection system may include injecting the fluid into the air inlet path below a predetermined altitude value, and not injecting the fluid into the air inlet path above the predetermined altitude value.

In any of the aspects or embodiments described above and herein, a portion of the ascent segment and a portion of the descent segment are below the predetermined altitude value.

In any of the aspects or embodiments described above and herein, each nozzle has an ejection centerline, and the ejection centerline of each nozzle may be oriented to inject the fluid in a forward first direction that is parallel to the axial centerline of the turbine engine, or the ejection centerline of each nozzle may be oriented to inject the fluid in a radial second direction that is perpendicular to the axial centerline of the turbine engine, or the ejection centerline of each nozzle may be oriented to inject the fluid in a direction that is between the forward first direction and the radial second direction.

In any of the aspects or embodiments described above and herein, the plurality of nozzles may include at least one aft oriented nozzle that has an ejection centerline, and the ejection centerline of the aft oriented nozzle may be oriented to inject the fluid in an aft direction at an acute angle relative to a radial line extending perpendicular to the axial centerline.

In any of the aspects or embodiments described above and herein, the acute angle may be no greater than seventy degrees.

In any of the aspects or embodiments described above and herein, the plurality of nozzles may be spaced apart from one another around a circumference of the nacelle inlet cavity and may be disposed in a lower circumferential half of the nacelle inlet cavity.

In any of the aspects or embodiments described above and herein, the plurality of nozzles may be circumferentially spaced apart from one another and may be disposed in a lower circumferential half of the nacelle inlet cavity and in an upper circumferential half of the nacelle inlet cavity.

In any of the aspects or embodiments described above and herein, the plurality of nozzles may include a first subgroup of nozzles configured to inject the fluid into the air inlet path a first distance and a second subgroup of nozzles configured to inject the fluid into the air inlet path a second distance, wherein the first distance is greater than the second distance.

According to another aspect of the present disclosure, an aircraft is provided that includes a turbine engine, a nacelle, a fluid injection system, and a controller. The turbine engine has a fan section, a compressor section, a turbine section, and a bypass duct arranged along an axial centerline. The compressor section and the turbine section are in communication with a core gas path, and the bypass duct is disposed radially outside of the core gas path. The nacelle is configured to house the turbine engine. The nacelle includes a nacelle inlet cavity disposed forward of the fan section. The nacelle inlet cavity defines an air inlet path for air drawn into the turbine engine during operation of the turbine engine. The fluid injection system includes a plurality of nozzles in fluid communication with a fluid source. The nozzles are in communication with the nacelle inlet cavity. The nozzles are configured to inject a fluid into the air inlet path. The controller is in communication with the fluid injection system and a non-transitory memory storing instructions. The instructions when executed cause the controller to control the fluid source to provide the fluid to the nozzles for injection into the air inlet path during at least one predetermined segment of an aircraft flight mission. The aircraft flight mission includes an idling segment, a taxiing segment, a take-off segment, an ascent segment, a descent segment, and a landing segment. The turbine engine is configured such that particles entrained within the inlet air that are wetted by the injected fluid are directed to flow through the bypass duct.

In any of the aspects or embodiments described above and herein, the instructions when executed may cause the controller to control the fluid source to provide the fluid to the nozzles below a predetermined altitude value, and to not provide fluid to the nozzles above the predetermined altitude value.

In any of the aspects or embodiments described above and herein, the plurality of nozzles may be pivotally mounted.

In any of the aspects or embodiments described above and herein, the pivotally mounted nozzles may be controllable to pivot between a first positional orientation and a second positional orientation.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
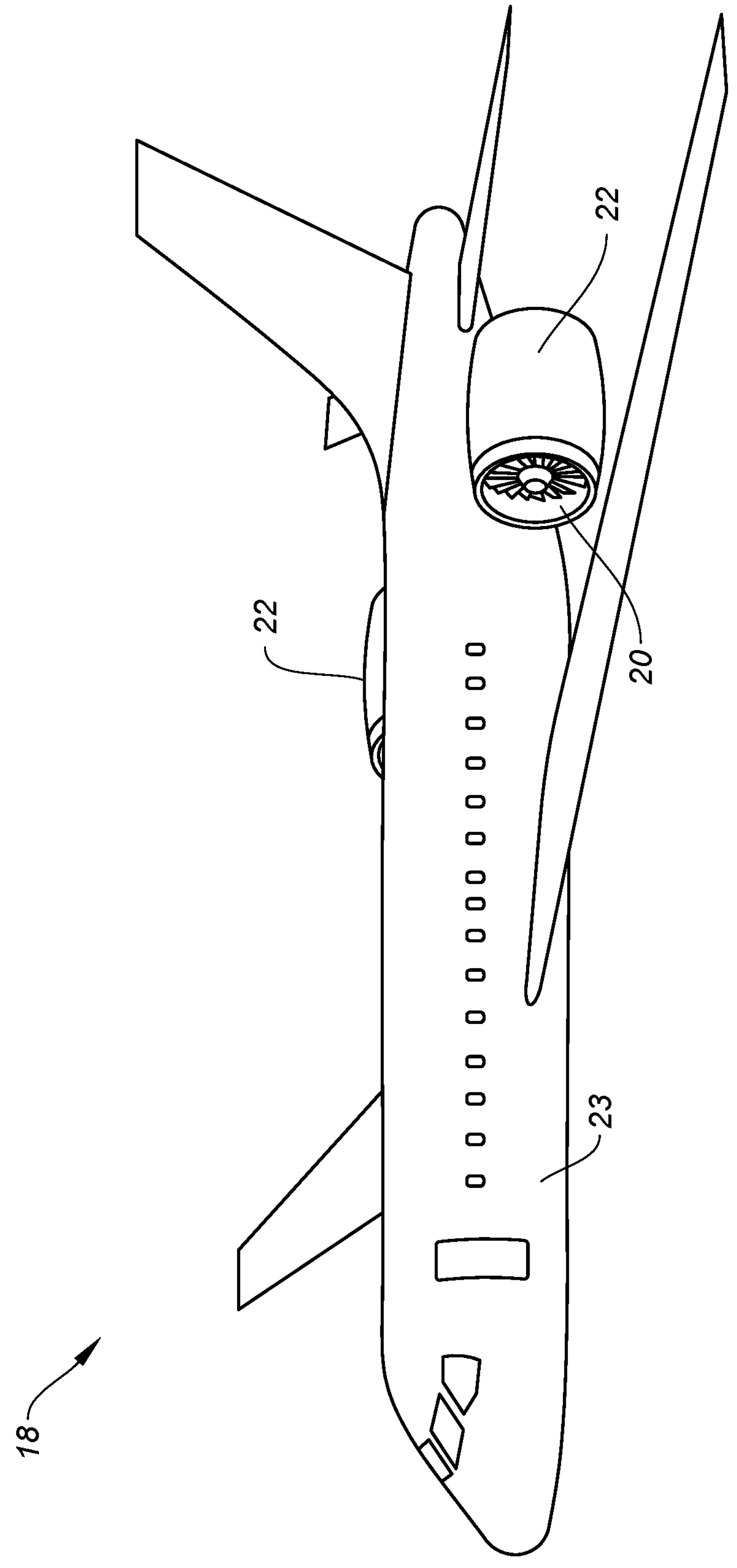
FIG. 1 is a diagrammatic view of an aircraft having a pair of nacelles and engines.

FIG. 1 is a diagrammatic view of an aircraft 18 that includes a pair of engines 20, a pair of nacelles 22, and a fuselage 23.

Figure 2:
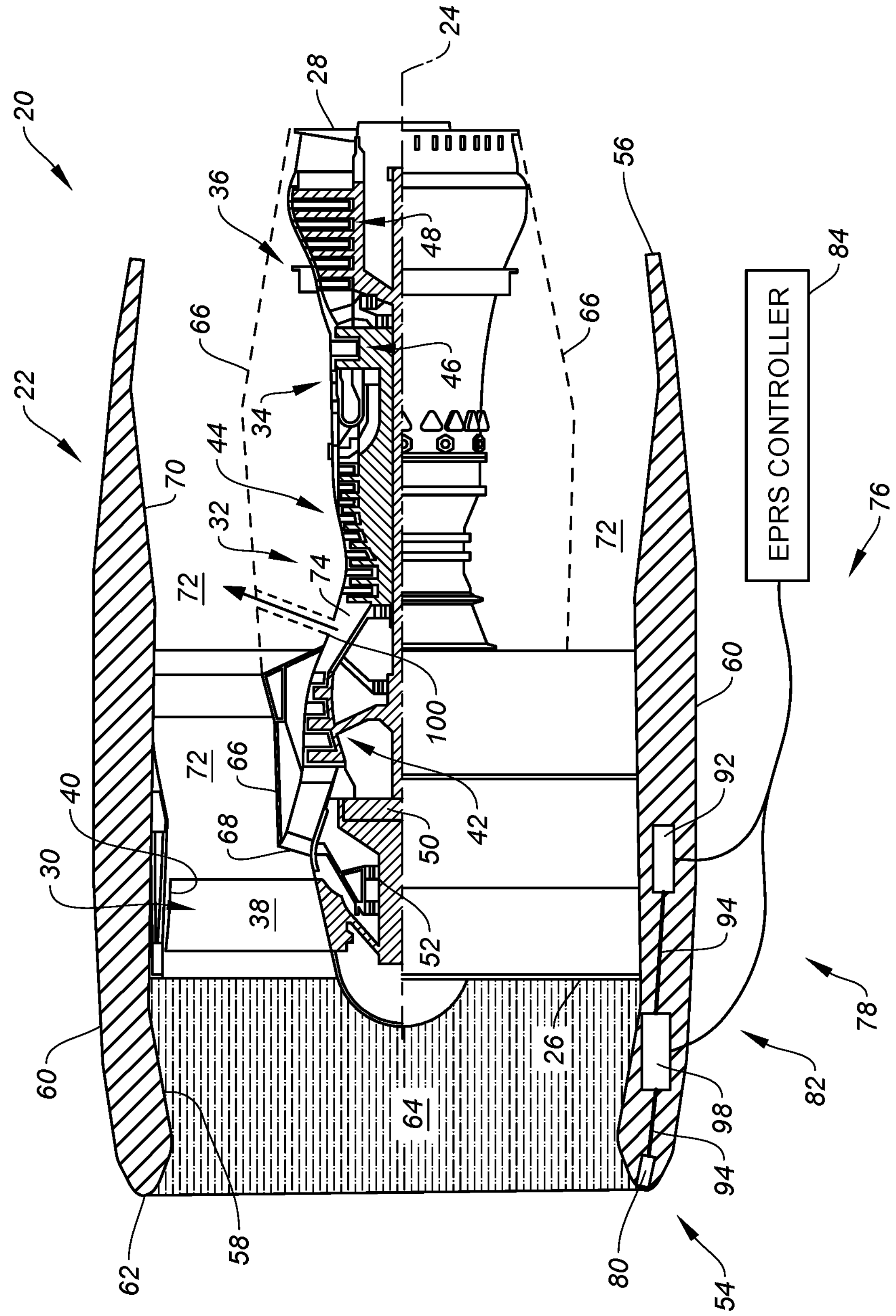
FIG. 2 is a diagrammatic sectional view of a gas turbine engine embodiment.

FIG. 2 shows a partially sectioned diagrammatic view of a geared gas turbine engine 20 disposed within a nacelle 22. The gas turbine engine 20 extends along an axial centerline 24 between an upstream airflow inlet 26 and a downstream airflow exhaust 28. The gas turbine engine 20 includes a fan section 30, a compressor section 32, a combustor section 34, and a turbine section 36. The fan section 30 includes a fan rotor stage that has a plurality of fan blades 38 extending radially outward from a hub. Each fan blade 38 includes a fan blade tip at its outermost radial end. A fan shroud 40 is disposed radially outside of the fan rotor stage. The compressor section 32 includes a low-pressure compressor (LPC 42) and a high-pressure compressor (HPC 44). The turbine section 36 includes a high-pressure turbine (HPT 46) and a low-pressure turbine (LPT 48). The engine sections are arranged sequentially along the axial centerline 24. The fan section 30 is connected to a geared architecture 50, for example, through a fan shaft 52.

FIG. 2 diagrammatically illustrates a nacelle 22 disposed radially outside of the engine 20. The nacelle 22 may be described as extending axially between a forward end 54 and an aft end 56. The nacelle 22 includes an inlet panel 58, an exterior surface panel 60, and a leading edge panel 62 that extends between the inlet panel 58 and the exterior surface panel 60. The region of the nacelle 22 from the forwardmost point (i.e., the "apex") of the leading edge panel 62 aft to the fan section 30 is referred to herein as the nacelle inlet cavity 64. The nacelle inlet cavity 64 (shown as a shaded region in FIG. 2) may be defined by a portion of the leading edge panel 62 and the inlet panel 58. The nacelle inlet cavity 64 functions as a passageway into the fan section 30. The inlet panel 58 may be unitary structure or may be collectively formed from a plurality of panels. The inlet panel 58 may extend between the leading edge panel 62 and the fan shroud 40. The term "exterior surface panel 60" is used herein to refer to those structures/panels that form the exterior surface of the nacelle 22 aft of the leading edge panel 62. Aft of the fan section 30, a bypass flow path inner structure 66 (shown in part by dashed line) is disposed radially outside of a compressor inlet 68, the compressor section 32, the combustor section 34, and the turbine section 36. Also aft of the fan section 30, a bypass flow path outer structure 70 (diagrammatically shown as part of the nacelle 22) is spaced apart from and disposed radially outside the bypass flow path inner structure 66. The annular region disposed between the bypass flow path inner and outer structures 66, 70 form a bypass duct 72 (sometimes referred to as a "fan duct").

During engine 20 operation, air enters the nacelle inlet cavity 64 and travels aft to the fan section 30. The inlet air is worked by the fan section 30. A portion of that worked air ("bypass air") travels aft and enters the bypass duct 72 and provides a portion of the thrust produced by the engine 20. The remainder of the air worked by the fan section 30 enters the compressor inlet 68, subsequently entering the core gas path 74 through the compressor section 32, combustor section 34, and the turbine section 36 before exiting the engine 20. The terms "forward", "leading", "aft, "trailing" are used herein to indicate the relative position of a component or surface. As air passes through the engine 20, a "leading edge" of a stator vane or rotor blade encounters the air before the "trailing edge" of the same. In a conventional axial engine such as that shown in FIG. 2, the fan section 30 is "forward" of the compressor section 32 and the turbine section 36 is "aft" of the compressor section 32. The terms "inner radial" and "outer radial" refer to relative radial positions from the engine centerline 24. An inner radial component or path is disposed radially closer to the engine centerline 24 than an outer radial component or path.

The gas turbine engine 20 diagrammatically shown in FIG. 2 is an example provided to facilitate the description herein. The present disclosure is not limited to any particular gas turbine engine configuration having a bypass air configuration, including the two-spool engine configuration shown, and may be utilized with single spool gas turbine engines as well as three spool gas turbine engines and the like.

Embodiments of the present disclosure include an entrained particle removal system 76 ("EPRS") that includes a fluid injection system 78 having a plurality of nozzles 80 and a fluid source 82. In some embodiments, the entrained particle removal system 76 may include a dedicated controller 84 or may be in communication with a shared controller that provides the functionality described herein with respect to entrainer particle removal system 76 as well as functionality for other engine 20 or aircraft systems. To facilitate the description herein, both the dedicated controller and the shared controller will be referred to as the "controller 84" and the present disclosure is not limited to either embodiment.

Figure 3B:
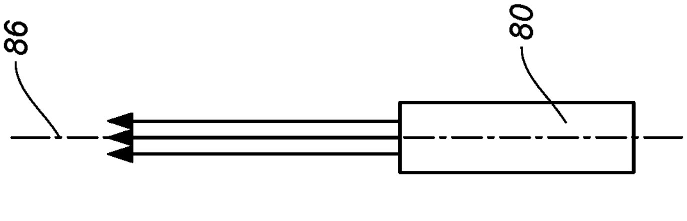
FIGS. 3-3B are each a diagrammatic view of a nozzle embodiment.
Figure 3A:
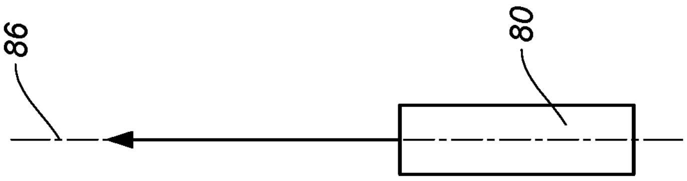
Figure 3:
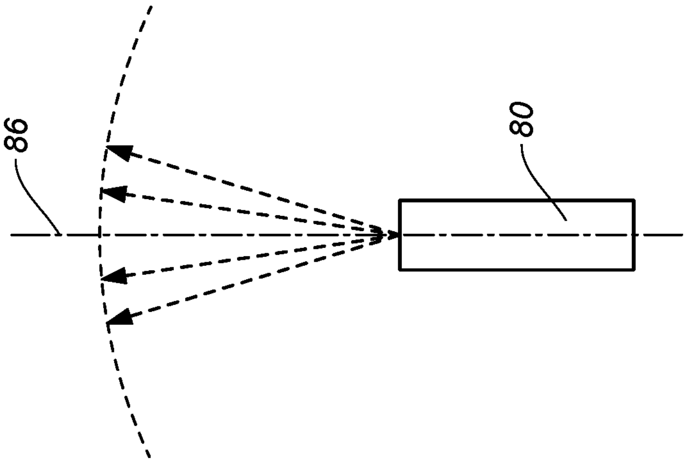

The nozzles 80 are configured to produce a distribution of fluid exiting the nozzles 80. The distribution may be in the form of a spray (e.g., a pattern of droplets-see FIG. 3), or a single stream (e.g., see FIG. 3A), or a plurality of streams (e.g., see FIG. 3B), or the like. Each nozzle 80 has a centerline that may be referred to as an "ejection centerline 86". For many nozzle 80 configurations, the direction that the nozzle 80 directs fluid outwardly is centered on the ejection centerline 86. For example, if the nozzle 80 is configured to produce a stream of fluid, that fluid stream may travel along the ejection centerline 86 for at least a distance after exiting the nozzle 80. As another example, if the nozzle 80 is configured to produce a spray of fluid, that fluid spray may be generally centered (in two or three dimensions) along the ejection centerline 86 for at least a distance after exiting the nozzle 80.

Figure 4:
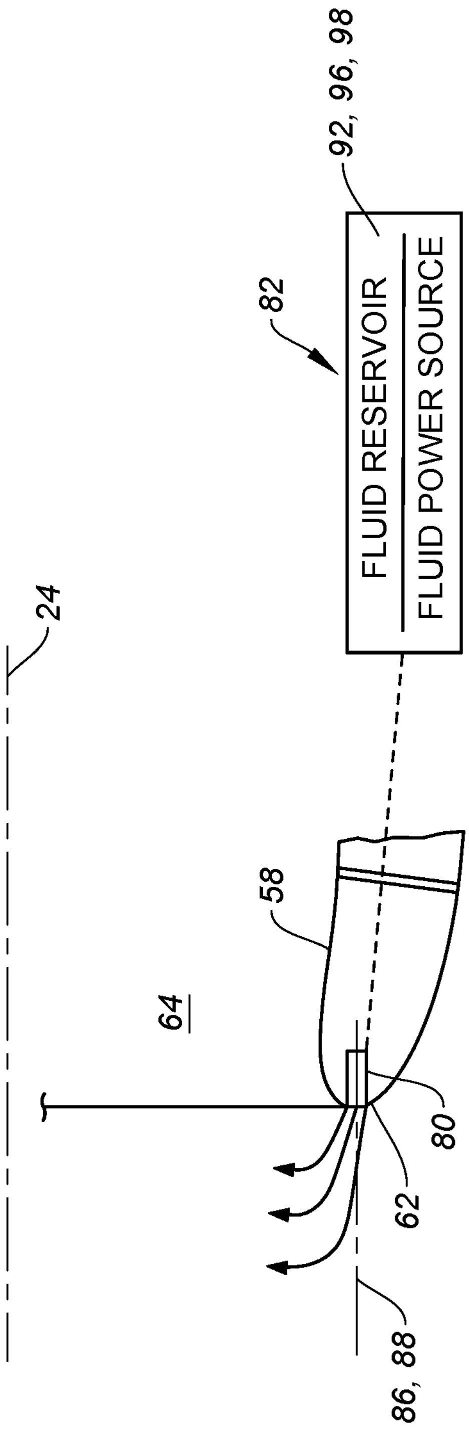
FIGS. 4-4E are each a diagrammatic view of a nozzle disposed to inject fluid into the nacelle inlet cavity.
Figure 4A:
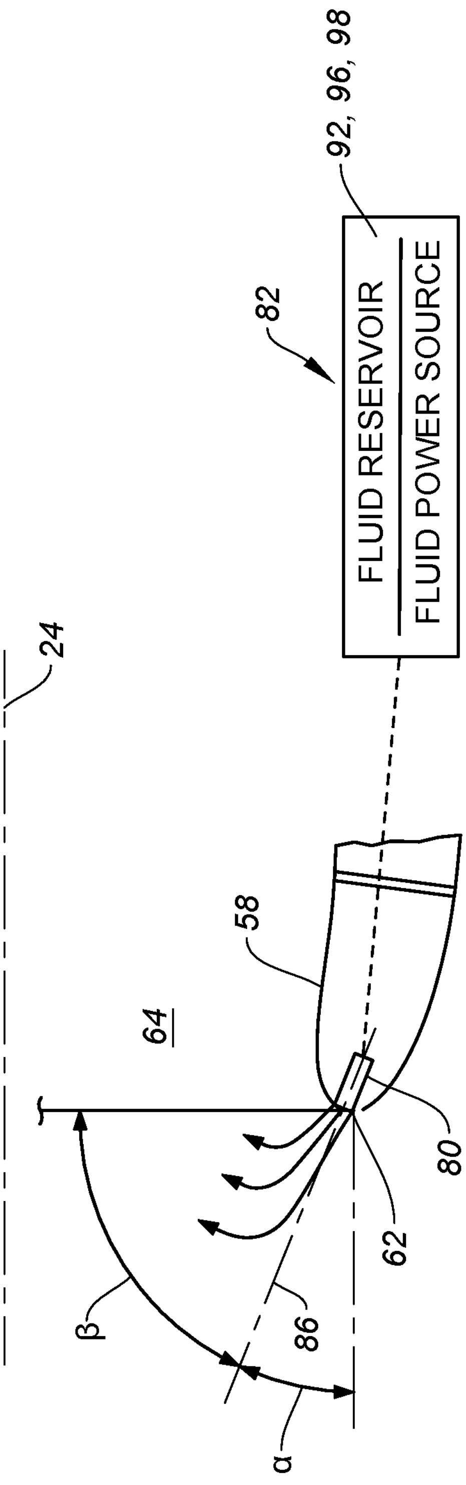
Figure 4B:
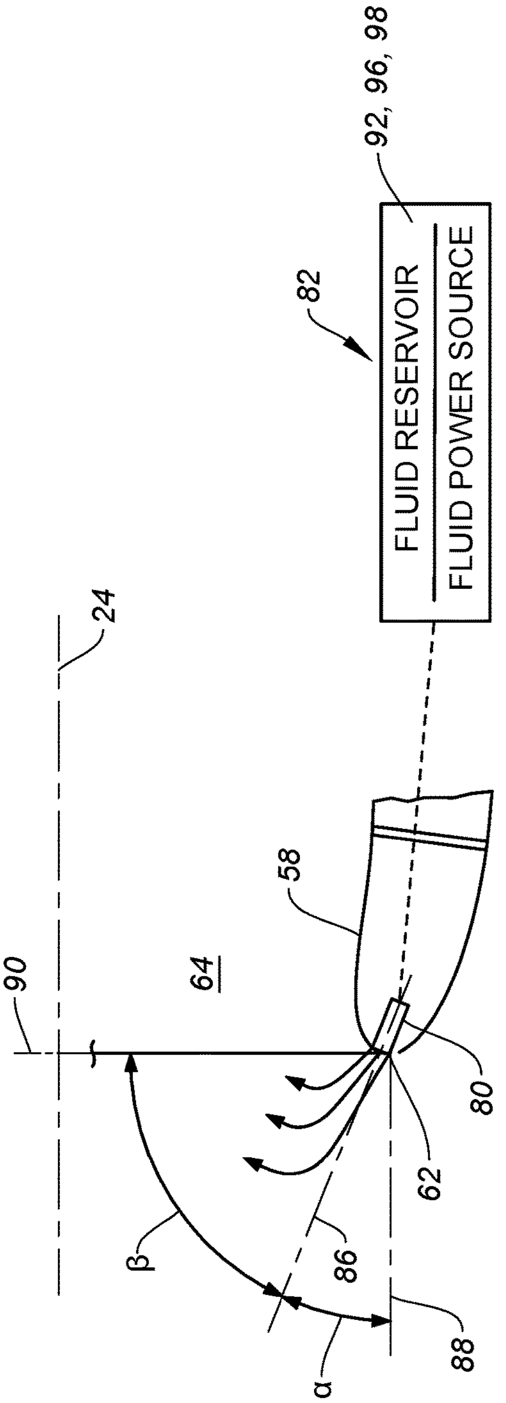
Figure 4C:
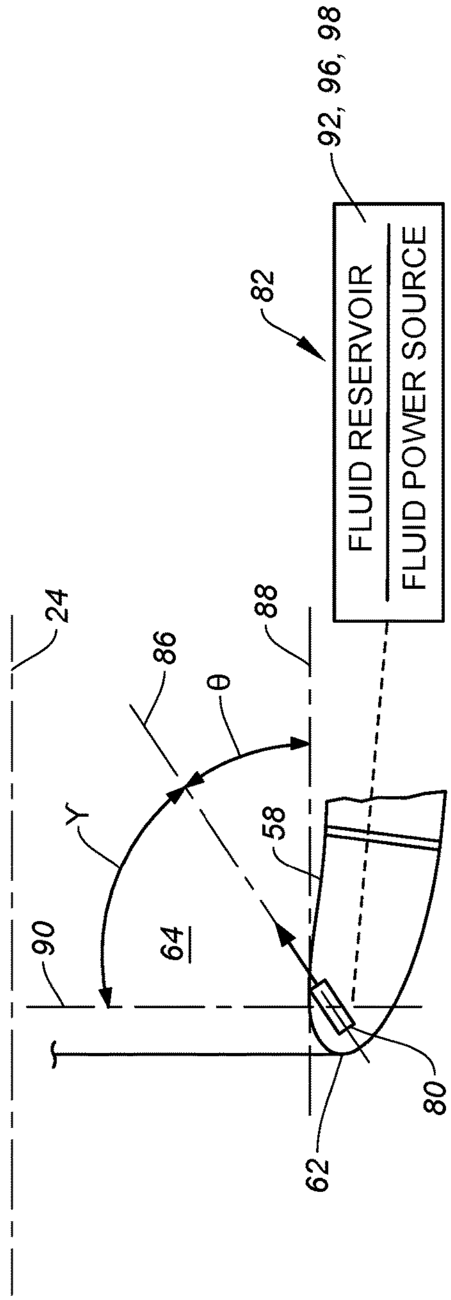
Figure 4D:
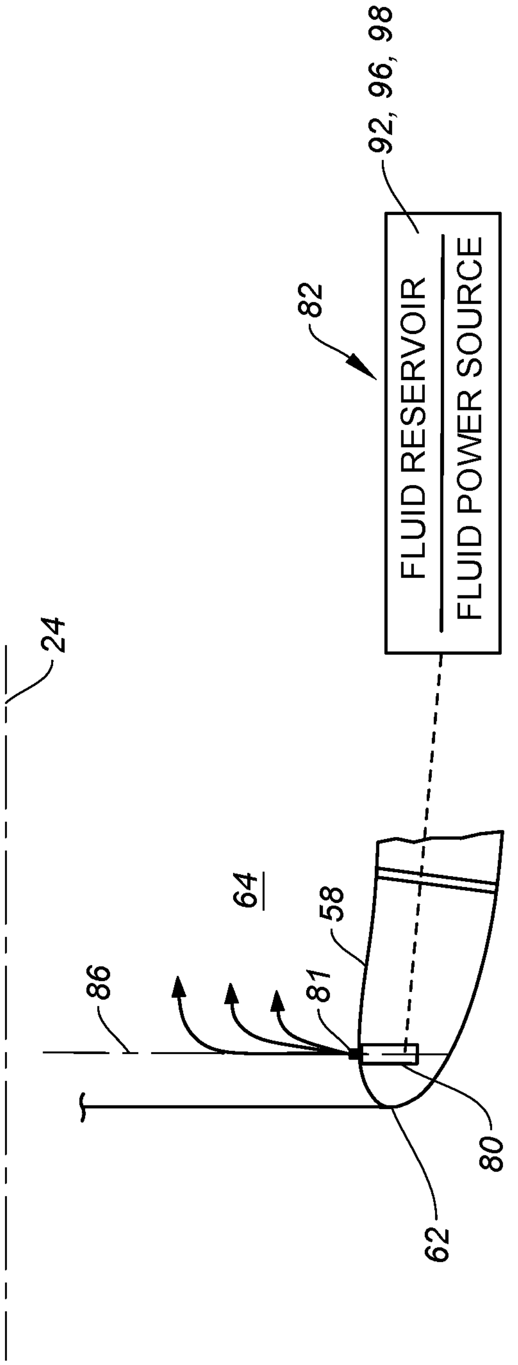

Referring to FIGS. 4A-C, in some embodiments, the nozzles 80 may be stationary nozzles 80 having a port end that is flush mounted. In some embodiments, the nozzles 80 may have a piston element 81 (see FIG. 4D) that extends outside of a mounting surface during use and retracts when not in use. As will be detailed herein (and diagrammatically shown in FIG. 4E), in some embodiments, a nozzle may be translatable between a plurality of positions to enable the nozzle to direct fluid outwardly in a plurality of different orientations.

The present disclosure is not limited to any particular nozzle 80 configuration other than one that is acceptable for the purposes described herein. In some system embodiments, all of the nozzles 80 may have the same configuration; e.g., a single configuration type. In some system embodiments, the nozzles 80 may include a plurality of different configuration types; e.g., some of the nozzles 80 may have a first configuration, while other nozzles 80 have a second configuration type. As a more specific example, in those system embodiments having a plurality of different nozzle 80 configuration types the system may include first nozzles 80 configured to propel a fluid a first maximum distance away from the nozzle 80, second nozzles 80 configured to propel a fluid a second maximum distance away from the nozzle 80, and so on, wherein the first and second maximum distances are different from one another; e.g., as diagrammatically shown in FIG. 6 and described herein. As another more specific example, in those system embodiments having a plurality of different nozzle 80 configuration types the system may include first nozzles 80 configured to produce a fluid spray, second nozzles 80 configured to produce a fluid stream, and the like.

The nozzles 80 are disposed in communication with nacelle inlet cavity 64; i.e., the nozzles 80 may be disposed in communication with a nacelle cavity portion of the leading edge panel 62 or the inlet panel 58, or any combination thereof. FIG. 4 diagrammatically illustrates a nozzle 80 disposed at the nacelle leading edge panel 62 that is oriented to direct fluid outwardly in a forward direction; e.g., the ejection centerline 86 of the nozzle 80 is substantially parallel to the engine axial centerline 24. FIG. 4A diagrammatically illustrates a nozzle 80 disposed at the nacelle inlet panel 58 that is oriented to direct fluid outwardly in a radial direction; e.g., the ejection centerline 86 of the nozzle 80 is substantially perpendicular to the engine axial centerline 24. A nozzle 80 disposed at the nacelle inlet panel 58 may alternatively be configured to direct fluid outwardly in a direction that has a forward component and a radial component. FIG. 4B diagrammatically illustrates a nozzle 80 disposed at the nacelle leading edge panel 62 that is oriented to direct fluid outwardly in a direction that has a forward component and a radial component; i.e., in a direction that is disposed somewhere between a line (line 88 shown in FIG. 4B) parallel to the engine centerline 24 and a line (line 90 shown in FIG. 4B) perpendicular to the engine centerline 24. For illustration purposes, the ejection centerline 86 of the nozzle 80 is shown disposed at complementary angles alpha ("α") relative to a line 88 substantially parallel to the engine axial centerline 24, and beta ("β") relative to a line 90 substantially perpendicular to the engine axial centerline 24. FIG. 4C diagrammatically illustrates a nozzle 80 disposed at the nacelle leading edge panel 62 that is oriented to direct fluid outwardly in a direction that has an aft component and a radial component; i.e., in an aft direction that is disposed somewhere between a line 88 parallel to the engine centerline 24 and a line 90 perpendicular to the engine centerline 24. For illustration purposes, the ejection centerline 86 of the nozzle 80 shown in FIG. 4C is disposed at complementary angles theta ("θ") relative to a line 88 substantially parallel to the engine axial centerline 24, and gamma ("γ") relative to a line 90 substantially perpendicular to the engine axial centerline 24. In these embodiments wherein a nozzle 80 is disposed at the nacelle leading edge panel 62 and is oriented to direct fluid outwardly in a direction that has an aft component and a radial component, it is understood that the nozzle orientation angle theta ("θ") relative to line 88 (parallel to the engine centerline 24) should be at least twenty degrees (and therefore angle gamma ("γ") no more than 70 degrees) to ensure the injected fluid appreciably enters the inlet airflow path for purposes of entrained particle removal.

Figure 4E:
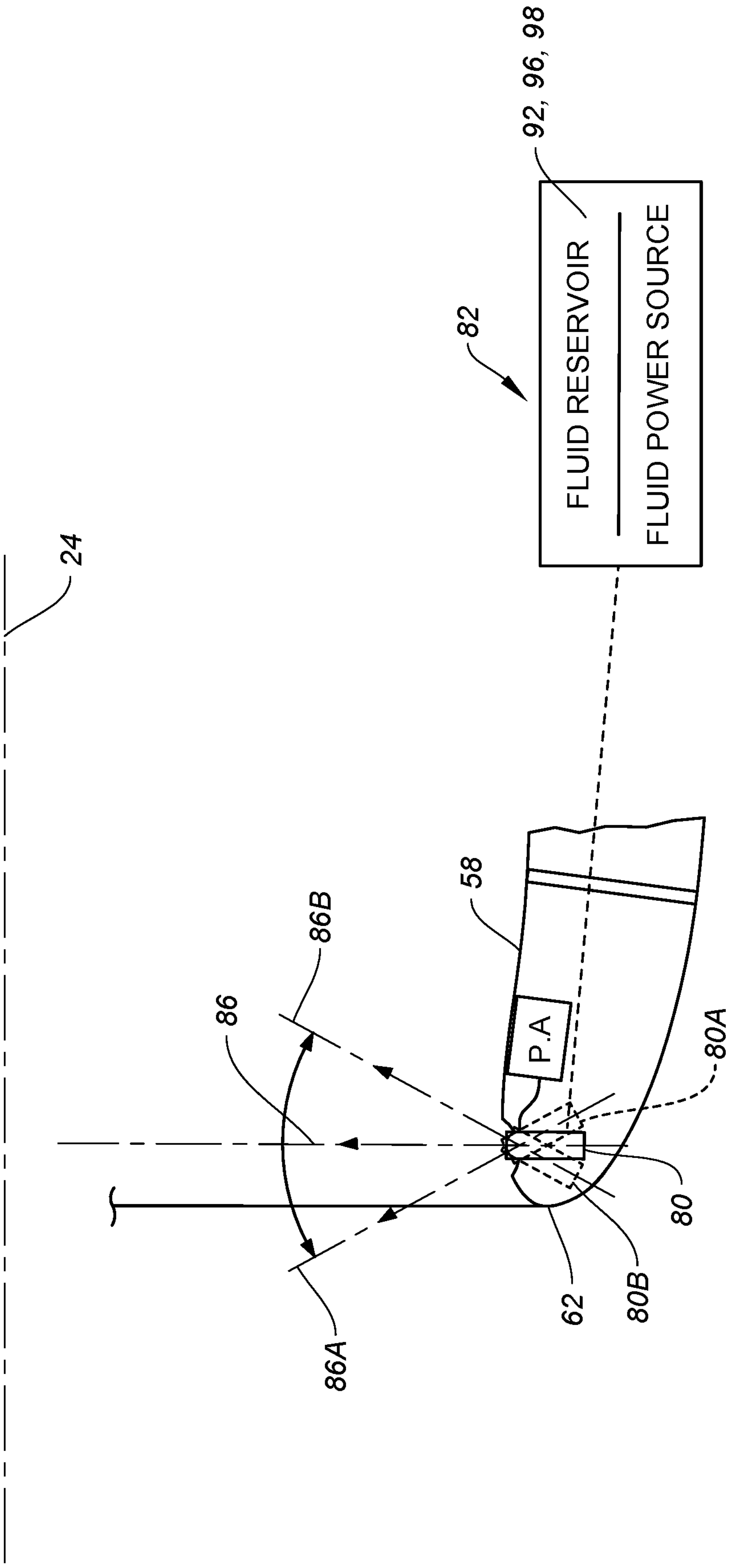

FIG. 4E illustrates an example of a nozzle configured in this manner wherein the nozzle 80 is pivotally mounted and can be rotated to change the orientation of the nozzle's fluid stream. FIG. 4E illustrates a nozzle 80 disposed in an orientation wherein the ejection centerline 86/stream is directed radially outward (e.g., in a direction perpendicular to the engine centerline 24), the same nozzle 80 shown in a second orientation (nozzle 80A shown in dashed lines) wherein the nozzle is disposed in an orientation wherein the ejection centerline/stream is directed radially outward and axially forward (ejection centerline 86A), and the same nozzle 80 shown in a third orientation (nozzle 80B shown in dashed lines) wherein the nozzle 80 is disposed in an orientation wherein the ejection centerline/stream is directed radially outward and axially aft (ejection centerline 86B). In these embodiments, the nozzles 80 may be adjustable to vary the nozzle orientation or may be controllable to vary the nozzle orientation. A non-limiting example of how the nozzle orientation may be controlled is a powered actuator ("P.A.") that is configured to translate the nozzle 80. Another non-limiting example of how the nozzle orientation may be controlled is a nozzle 80 that is configured to pivot as a function of the pressure of the fluid fed to the nozzle 80; e.g., at a first fluid pressure, the nozzle rotates to a first orientation, at a second fluid pressure, the nozzle 80 rotates to a second orientation, and so on. The present disclosure is not limited to any particular nozzle orientation control system. In those embodiments where the entrained particle removal system 76 includes translatable nozzles 80 and a nozzle orientation control system, the nozzle orientation control system may be configured to vary the nozzle orientation as a function of certain parameters such as, but not limited to, the current segment of the flight mission, or engine rotational velocity, or the like.

Figure 5:
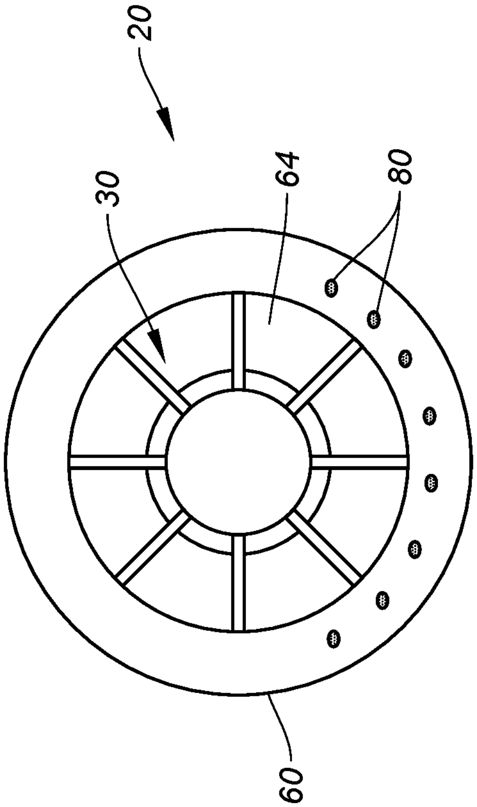
FIGS. 5-5B are each a diagrammatic view illustrating a nozzle distribution configuration.
Figure 5A:
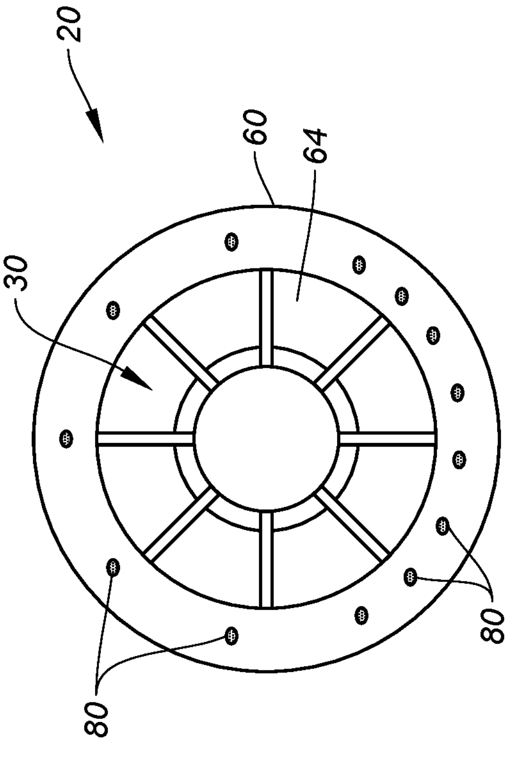
Figure 5B:
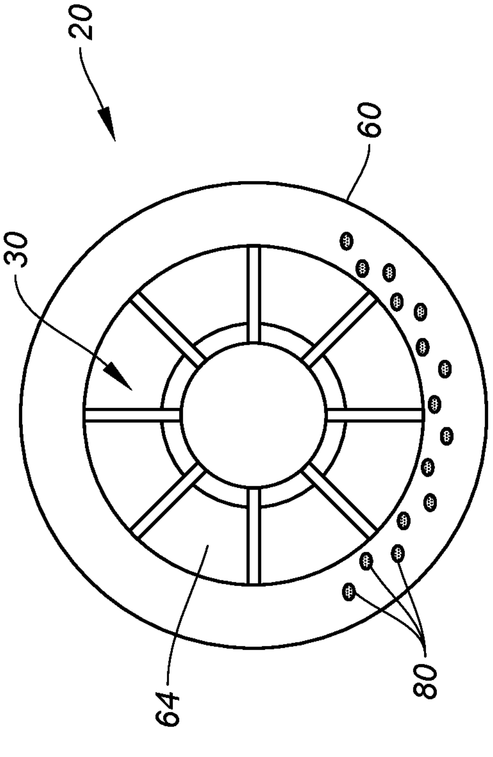

The nozzles 80 may be disposed around a portion of the nacelle 22 circumference or around the entire nacelle 22 circumference. FIG. 5 diagrammatically illustrates nozzles 80 disposed in the lower circumferential half of the nacelle 22 circumference; i.e., the nacelle 22 circumferential half closest to the ground when the aircraft is at rest. FIG. 5A diagrammatically illustrates nozzles 80 disposed around the entire nacelle 22 circumference. In some applications, disposing nozzles 80 in the lower circumferential half or a portion of the lower half (e.g., the lower one-third) is believed to be particularly beneficial. It is understood that a greater percentage of particulate matter enters the nacelle 22 in the lower circumferential portion of the nacelle 22 (particularly during ground portions of a flight mission). Hence, disposing nozzles 80 in the lower circumferential portion of the nacelle 22 places the fluid nozzles 80 where a higher density of particles are likely to be entrained in inlet air. The nozzles 80 may be uniformly spaced from one another, or the nozzles 80 may be spaced apart from one another at different circumferential spacings. FIG. 5 diagrammatically illustrates nozzles 80 uniformly spaced from one another in the lower circumferential half of the nacelle 22 circumference. FIG. 5A diagrammatically illustrates nozzles 80 spaced from one another by a first spacing distance in the lower circumferential half of the nacelle 22 circumference and nozzles 80 spaced from one another by a second spacing distance in the upper circumferential half of the nacelle 22 circumference, wherein the second spacing distance is greater than the first spacing distance; i.e., the number of nozzles 80 in the lower half is greater than the number of nozzles 80 in the upper half. The nozzles 80 may be disposed in a single row, or in multiple rows axially spaced apart from one another, or may be non-uniformly spaced from one another in an axial and/or circumferential direction. FIG. 5 diagrammatically illustrates nozzles 80 disposed in a single row, and FIG. 5B diagrammatically illustrates nozzles 80 disposed in a plurality of rows. The present disclosure is not limited to any particular axial and/or circumferential arrangement of nozzles 80 in communication with nacelle inlet cavity 64.

Figure 7:
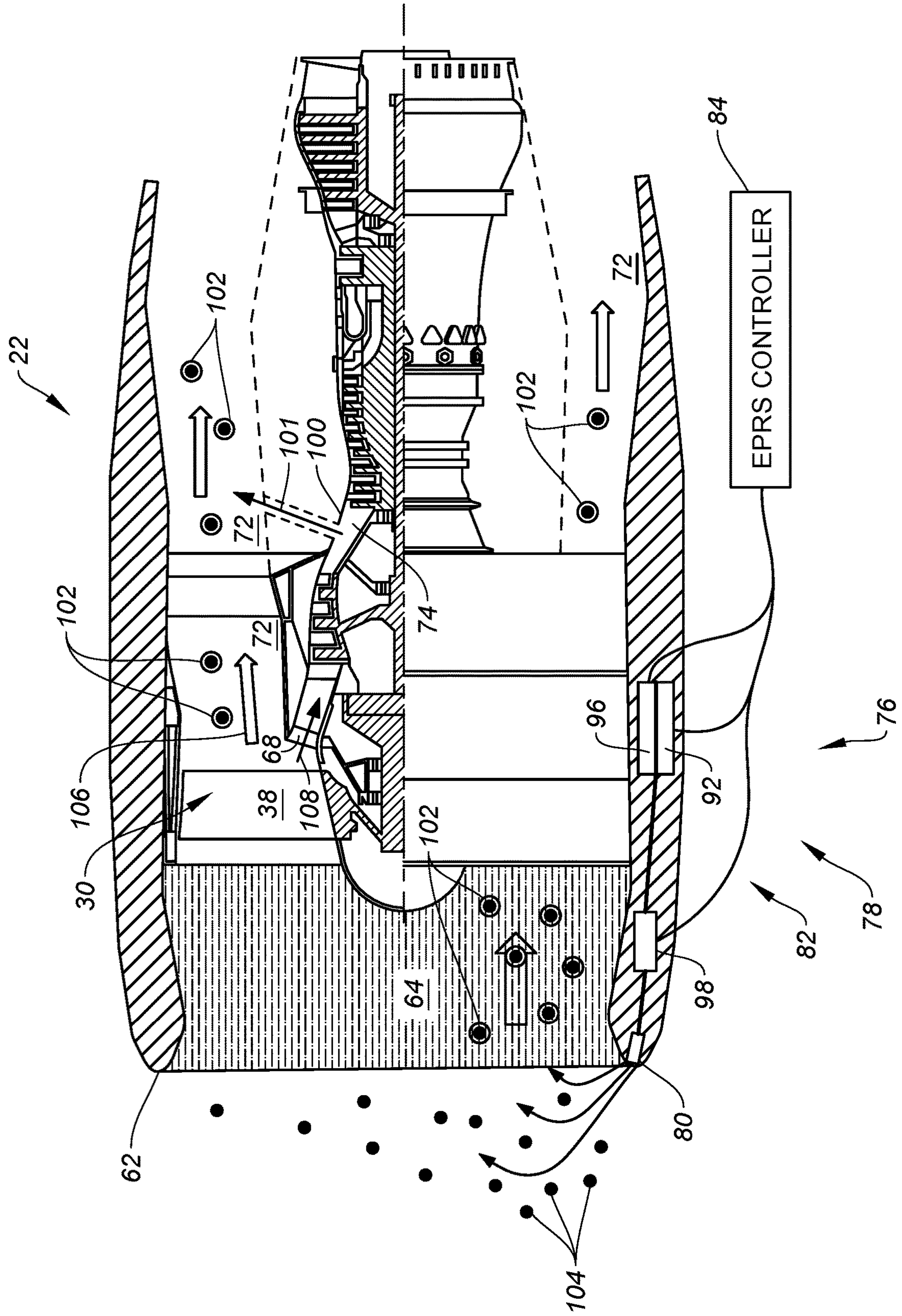
FIG. 7 is a diagrammatic sectional view of a gas turbine engine embodiment.

The fluid source 82 may include a primary reservoir 92 (or reservoirs) for containing a volume of fluid for dispensing via the nozzles 80 and one or more fluid conduits 94 (e.g., tubing, piping, or the like) between the primary reservoir 92 and the nozzles 80. In some embodiments, the fluid source 82 may include one or more secondary reservoirs 96 (e.g., see FIG. 7) configured to store a secondary fluid. The secondary reservoir 96 may be in communication with the primary reservoir 92 (e.g., to pass a secondary fluid into the primary reservoir 92 or to the nozzles 80) or may be in communication with the fluid conduits 94 to provide the secondary fluid to the nozzles 80. The primary reservoir 92 (and secondary reservoir 96 when included) may be located in the nacelle 22, or elsewhere. The fluid source 82 includes structure 98 for causing a flow of fluid to pass from the primary reservoir 92 (and/or the secondary reservoir 96) to the nozzles 80, and/or between the reservoirs 92, 96. The structure 98 may be a pump, or a reservoir pressurization system, or the like. In some embodiments, the fluid source 82 may include controllable fluid control hardware to control the flow parameters (e.g., volume, pressure, velocity, and the like) of fluid exiting the nozzles 80. In some embodiments, the fluid source 82 may include a manifold or similar structure to distribute fluid to the nozzles 80. The present disclosure is not limited to any particular structure 98 for causing a flow of fluid to pass from the reservoir(s) 92, 96 to the nozzles 80 and/or any particular control hardware for controlling the flow parameters (e.g., volume, pressure, velocity, and the like) of fluid exiting the nozzles 80.

The controller 84 is in communication with entrained particle removal system 76 components such as the fluid source 82. In some system embodiments, the controller 84 may also be in communication with controllable fluid control hardware (e.g., valving, or the like), sensors, one the like. The controller 84 may be in communication with these components to control and/or receive signals therefrom to perform the functions described herein. The controller 84 may include any type of computing device, computational circuit, processor(s), CPU, computer, or the like capable of executing a series of instructions that are stored in memory. The instructions may include an operating system, and/or executable software modules such as program files, system data, buffers, drivers, utilities, and the like. The executable instructions may apply to any functionality described herein to enable the system to accomplish the same algorithmically and/or coordination of system components. The controller 84 includes or is in communication with one or more memory devices. The present disclosure is not limited to any particular type of memory device, and the memory device may store instructions and/or data in a non-transitory manner. Examples of memory devices that may be used include a computer readable storage medium, a read-only memory, random access memory, volatile memory, non-volatile memory, static memory, dynamic memory, flash memory, cache memory, and/or any device that stores digital information. The controller 84 may include, or may be in communication with, an input device that enables a user to enter data and/or instructions, and may include, or be in communication with, an output device configured, for example to display information, or to transfer data, etc. Communications between the controller 84 and other system components may be via a hardwire connection or via a wireless connection.

As will be described in detail herein, in some embodiments the entrained particle removal system 76 may be in communication with a bleed air valve 100 configured to bleed core gas from the compressor section 32. For example, some gas turbine engine 20 embodiments include a bleed air valve 100 disposed between the LPC 42 and the HPC 44 (e.g., see FIGS. 1 and 6). In these embodiments, the entrainer particle removal system 76 may be configured to actuate the bleed air valve 100 under certain circumstances.

The fluid may be any type of fluid that can be distributed and that will attach to particles entrained within the nacelle inlet air. The fluid attached to an entrained particle creates a "wetted particle" that is much heavier than the entrained particle itself. A non-limiting example of an acceptable fluid is water. In some instances, additives may be added to a fluid like water to enhance the functionality of the fluid; e.g., an additive that increases the propensity of the fluid to bind with and "wet" particles, or an additive that decreases the freezing temperature of the fluid, or an anti-corrosion additive, or the like, or any combination thereof. In those embodiments that include a secondary reservoir(s) 96, the additive fluid(s) may be disposed in the secondary reservoirs(s) 96. In an aircraft application where water may be produced or collected (e.g., a hydrogen-fueled engine, or an aircraft HVAC system, or the like), the produced or collected water may be directed to the primary reservoir 92 to replenish fluid as it is used.

In the operation of a turbine engine 20 (e.g., see FIG. 7), air is drawn into the turbine engine 20 via the nacelle inlet cavity 64 and subsequently drawn into the fan section 30. The air flow exiting the fan section 30 either passes into the bypass duct 72 or enters the core gas path 74. Air flow exiting the bypass duct 72 produces propulsive force at certain engine power settings. Air flow enters the core gas path 74 subsequently passes through the compressor, combustor, and turbine sections 32, 34, 36 before exiting the engine 20. In the absence of a system configured to remove entrained particulate matter, particulate matter may be drawn into the core gas path 74. Entrained particulate matter can be particularly problematic in the combustor section 34 and the turbine section 36 where component cooling is required. In many applications, engine 20 cooling schemes use relatively small diameter cooling apertures to produce impingement cooling and/or to establish cooling air boundary layer flow adjacent to a component surface, or the like. In these instances, the diameter of the cooling aperture may be directly related to the desired cooling effect. In some instances, the diameter of the cooling aperture is limited by the potential for particulate fouling; i.e., a minimum diameter of a cooling aperture is selected to avoid fouling and a consequent cooling deficit.

The present disclosure entrained particle removal system 76 provides a novel and unobvious system and method for removing entrained particles upstream of the engine 20 components where particulate fouling is problematic; i.e., engine hot section components that utilize cooling air. The present disclosure entrained particle removal system 76 is configured and controllable to inject fluid into the airflow passing through the nacelle inlet cavity 64 upstream of the fan section 30. The fluid initially stored in the reservoir(s) 92, 96 is provided to the nozzles 80. The structure 98 for providing the fluid (e.g., pump, pressurized reservoir, fluid valving, and the like) may be chosen for the application at hand and the present disclosure is not limited to any particular mechanism. The fluid is injected into the nacelle inlet cavity 64 via the nozzles 80 where it is incorporated with the inlet air flow. Some of the incorporated fluid will encounter particulate matter entrained within the airflow. Fluid encountering the particles will bind with the particles to form "wetted particles 102" having a mass greater than particles that have not been bound with fluid; i.e., "unwetted particles 104". The specific binding process that occurs between particles 104 and fluid to form wetted particles 102 may vary as a function of the type of particulate matter, or the fluid, or environmental factors, or the like, or any combination thereof. Electrostatic attraction is a non-limiting example of a binding process that forms wetted particles 102. The present disclosure is not limited to any particular binding process for forming wetted particles 102.

The inlet air flow, now including wetted particles 102, enters and is worked by the fan section 30. Within and aft of the fan section 30, the inlet air worked by the fan section 30 will include a rotational component and an axial component. The wetted particles 102 (greater mass) within the rotating air flow are subject to centrifugal forces that force the wetted particles 102 radially outward as they travel axially aft. As indicated above and shown in FIG. 7, air flow exiting the fan section 30 either passes into the bypass duct 72 (shown as arrows 106) or enters the core gas path 74 (shown as arrow 108). The bypass duct 72 is disposed radially outside of the compressor inlet 68. Hence, the wetted particles 102 driven radially outward by centrifugal forces are drawn into the bypass duct 72 rather than being drawn into the core gas path 74 where particulate matter can be problematic. In this manner, it is understood that a substantial percentage of entrained particles can be "removed" from the airflow entering the core gas path 74.

Figure 6:
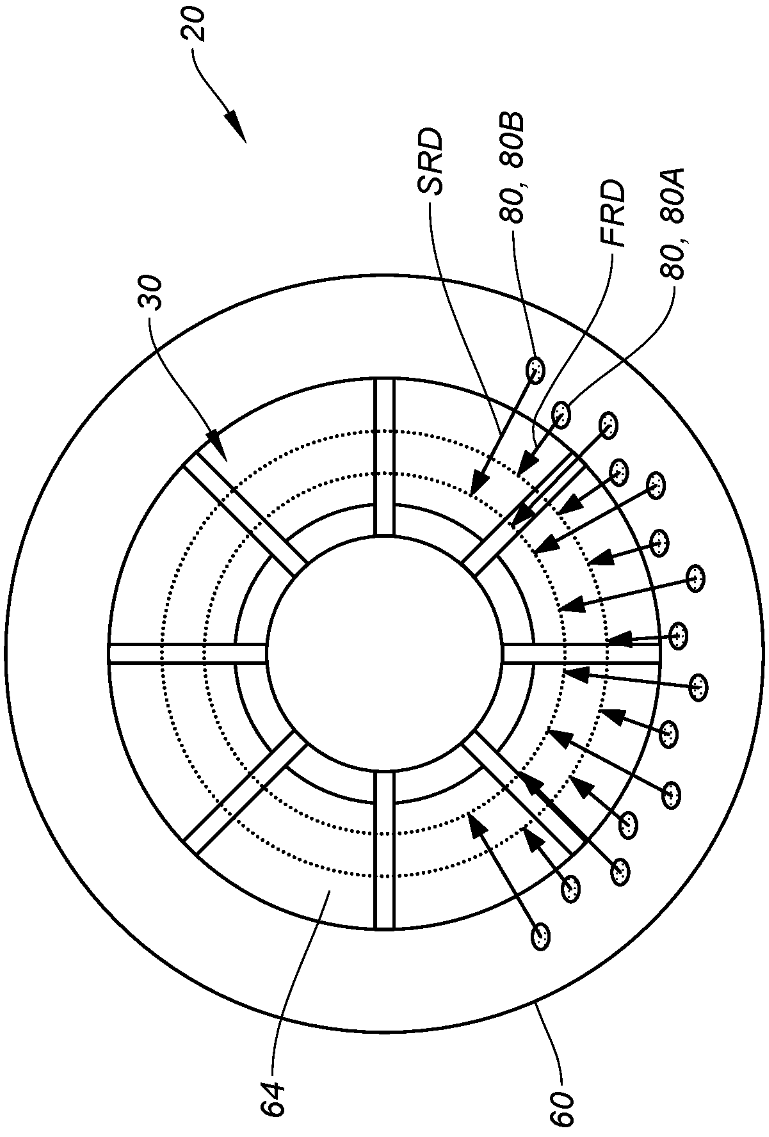
FIG. 6 is a diagrammatic view illustrating first and second nozzle configurations configured to inject fluid different distances.

Inlet air flow will redirect the injected fluid in a direction axially into the engine 20. Embodiments of the present disclosure entrained particulate removal system 76 may be configured to inject fluid in a manner so that the fluid reaches different radial positions within the inlet air flow prior to being redirected axially to increase the probability that entrained particles within the airflow will encounter fluid and become wetted particles 102. Injecting fluid to different radial positions may be accomplished in a variety of different ways; e.g., spray nozzles 80 for a first radial distance (FRD) injection, first stream nozzles 80 that produce a first fluid velocity for a second radial distance (SRD) injection, and second stream nozzles 80 that produce a second fluid velocity (greater than the first fluid velocity) for a third radial distance (TRD) injection, where the third radial distance is greater than the second radial distance and the second radial distance is greater than the first radial distance (TRD>SRD>FRD). FIG. 6 diagrammatically illustrates first nozzles 80A injecting fluid a first radial distance (FRD), and second nozzles 80B injecting fluid a second radial distance (SRD), wherein the second radial distance is greater than the first radial distance (SRD>FRD).

In some embodiments, the present disclosure entrained particle removal system 76 may be in communication with a compressor bleed valve 100 configured to bleed core gas from the compressor section 32. The aforesaid bled core gas may be directed (e.g., see arrow 101) from the compressor section 32 and into the bypass duct 72 as diagrammatically shown in FIG. 7. These embodiments are directed to removing wetted particles 102 (and/or other entrained particles) from the compressor section 32 that were not removed via the bypass duct 72. The present system controller 84 may be in communication with the bleed valve 100 to selectively actuate the bleed valve 100 in coordination with fluid being injected into the inlet air flow via the nozzles 80.

Figure 8:
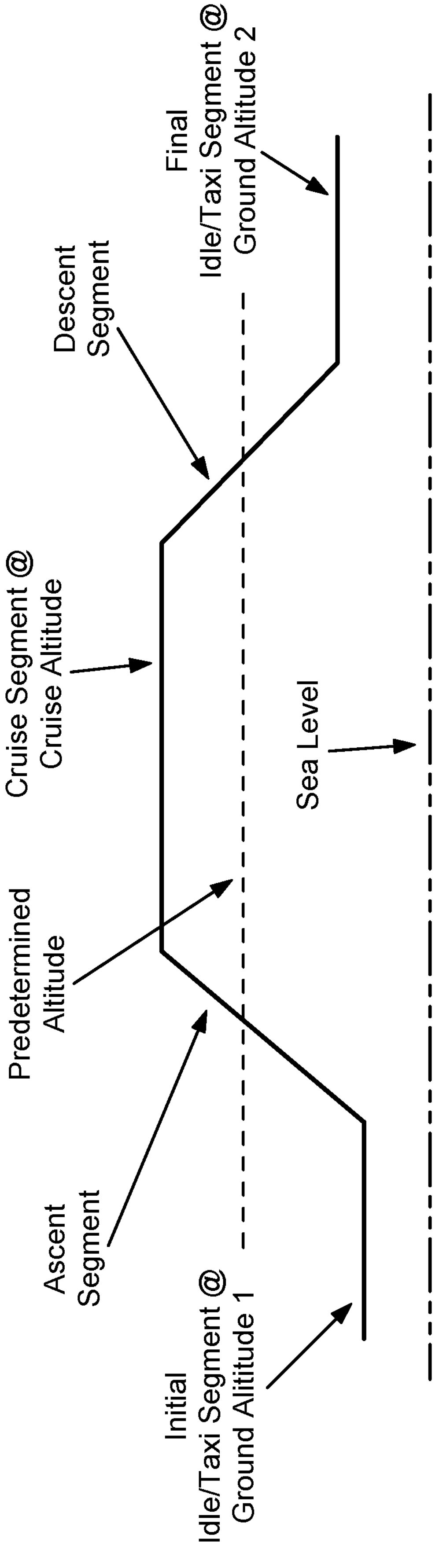
FIG. 8 is a diagrammatic view of a typical flight mission.

The term "flight mission" is used herein to describe an entire operational mission of an aircraft; e.g., initial idling (with the aircraft stationary), taxiing, takeoff, ascent, cruise, descent, landing, return taxing, and the like. The term "takeoff" as used herein refers to ground travel of the aircraft that is intended to achieve liftoff from the ground. The term "landing" as used herein refers to ground travel of the aircraft after the aircraft has touched down to the ground. FIG. 8 diagrammatically illustrates a typical flight mission that begins with an initial idle/taxi segment at a first geographical location disposed at a first ground altitude. The term "ground altitude" refers to the altitude of the ground at a given location above sea level. FIG. 8 further illustrates an ascent segment that extends from the first ground altitude to a cruise segment disposed at a cruise altitude, and a descent segment that extends from the cruise altitude to an final idle/taxi segment disposed at a second geographical location at a second ground altitude. The first and second ground altitudes may differ from one another. The typical flight mission diagram shown in FIG. 8 has a single ascent segment, cruise segment, and descent segment to facilitate the description. A person of skill in the art will recognize that a flight mission may have several ascent, descent, and cruise segments. FIG. 8 further illustrates a single line representative of a predetermined flight altitude.

The present disclosure entrained particle removal system 76 may be controlled to selectively inject fluid into the inlet air. For example, the system 76 may be controlled to inject fluid into the inlet air throughout a flight mission of an aircraft. Alternatively, the system may be controlled to inject fluid into the inlet air only during certain segments of a flight mission. It is understood that the potential to ingest entrained particles is greatest when the aircraft engine 20 is on the ground, to a lesser extent at lower altitude elevations, and to a significantly lesser extent above a predetermined altitude. The system 76 may be controlled to inject fluid in a manner that reflects the potential for ingesting particulate matter; e.g., the system 76 may be controlled to inject fluid (i.e., an "on mode") into the inlet air during flight mission segments that are on the ground and possibly during flight at lower elevations (e.g., during initial idling, taxiing, takeoff, a portion of ascent, a portion of descent, landing, and return taxing) and not inject fluid (i.e., an "off mode") during the remaining flight mission segments (e.g., cruise). In this manner, the fluid used for injection may be economized while at the same time the present disclosure system provides protection during the segments when particle entrainment is greatest. In some embodiments, the present disclosure entrained particle removal system 76 may be configured to inject fluid into the inlet air during flight mission segments that are on the ground and up to or below a predetermined altitude; e.g., during initial idle/taxi, takeoff, a portion of ascent, a portion of descent, landing, and return taxi) and not inject fluid above the predetermined altitude. These embodiments of the present disclosure are not limited to any particular predetermined altitude. The predetermined altitude vary geographically/regionally. The predetermined altitude may be selected based on information relating to the potential presence of entrained particles as a function of altitude.

In some embodiments, the present disclosure system 76 may be configured to control the volume of fluid injected; e.g., the system 76 may be configured to selectively inject fluid at a first volumetric flow rate, or at a second volumetric flow rate, and so on, wherein the first and second volumetric flow rates are different from one another.

The above-described examples of how the present disclosure system 76 may be configured to selectively control when fluid is injected, how much fluid is injected, and the like are provided to illustrate how the present disclosure system 76 may be configured and the present disclosure is not limited thereto.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible.

The invention claimed is:

1. A method of removing particles entrained within an air flow that has entered a turbine engine disposed within a nacelle, the turbine engine including a fan section, a compressor section, a turbine section, and a bypass duct arranged along an axial centerline, wherein the compressor section and the turbine section are in communication with a core gas path, and the bypass duct is disposed radially outside of the core gas path, the nacelle including a nacelle inlet cavity disposed forward of the fan section, the nacelle inlet cavity defining an air inlet path into the turbine engine, the method comprising:

providing a fluid injection system configured to inject a fluid into the air inlet path from a plurality of nozzles in communication with the nacelle inlet cavity, the plurality of nozzles extending within a leading edge panel of the nacelle; and controlling the fluid injection system to inject the fluid into the air inlet path from the plurality of nozzles during at least one predetermined segment of an aircraft flight mission, the aircraft flight mission including an idling segment, a taxiing segment, a take-off segment, an ascent segment, a descent segment, and a landing segment;

wherein particles wetted by the injected fluid are subject to centrifugal force in and aft of the fan section and are directed radially outward for flow through the bypass duct;

wherein each nozzle has an ejection centerline, and the ejection centerline of each nozzle is pivotable to inject the fluid between a forward first direction that is parallel to the axial centerline of the turbine engine and a radial second direction that is perpendicular to the axial centerline of the turbine engine.

2. The method of claim 1, wherein the step of controlling the fluid injection system includes injecting the fluid into the air inlet path below a predetermined altitude value, and not injecting the fluid into the air inlet path above the predetermined altitude value.

3. The method of claim 2, wherein a portion of the ascent segment and a portion of the descent segment are below the predetermined altitude value.

4. The method of claim 1, wherein the plurality of nozzles includes at least one aft oriented nozzle that has an aft oriented nozzle ejection centerline, and the aft oriented nozzle ejection centerline is oriented to inject the fluid in an aft direction at an acute angle relative to a radial line extending perpendicular to the axial centerline.

5. The method of claim 4, wherein the acute angle is no greater than seventy degrees.

6. The method of claim 1, wherein the plurality of nozzles are spaced apart from one another around a circumference of the nacelle inlet cavity and are disposed in a lower circumferential half of the nacelle inlet cavity.

7. The method of claim 1, wherein the plurality of nozzles are circumferentially spaced apart from one another and are disposed in a lower circumferential half of the nacelle inlet cavity and in an upper circumferential half of the nacelle inlet cavity.

8. The method of claim 1, wherein the plurality of nozzles includes a first subgroup of nozzles configured to inject the fluid into the air inlet path a first distance and a second subgroup of nozzles configured to inject the fluid into the air inlet path a second distance, wherein the first distance is greater than the second distance.

9. An aircraft, comprising:

a turbine engine having a fan section, a compressor section, a turbine section, and a bypass duct arranged along an axial centerline, wherein the compressor section and the turbine section are in communication with a core gas path, and the bypass duct is disposed radially outside of the core gas path;

a nacelle configured to house the turbine engine, the nacelle including a nacelle inlet cavity disposed forward of the fan section, the nacelle inlet cavity defining an air inlet path for air drawn into the turbine engine during operation of the turbine engine; a fluid injection system including a plurality of nozzles pivotally mounted and in fluid communication with a fluid source, the nozzles in communication with the nacelle inlet cavity, the nozzles configured to inject a fluid into the air inlet path, and the nozzles extending within a leading edge panel of the nacelle; and a controller in communication with the fluid injection system and a non-transitory memory storing instructions, which instructions when executed cause the controller to control the fluid source to provide the fluid to the nozzles for injection into the air inlet path during at least one predetermined segment of an aircraft flight mission, the aircraft flight mission including an idling segment, a taxiing segment, a take-off segment, an ascent segment, a descent segment, and a landing segment;

wherein the turbine engine is configured such that particles entrained within the inlet air that are wetted by the injected fluid are directed to flow through the bypass duct;

wherein each nozzle has an ejection centerline, and the ejection centerline of each nozzle is pivotable to inject the fluid between a forward first direction that is parallel to the axial centerline of the turbine engine and a radial second direction that is perpendicular to the axial centerline of the turbine engine.

10. The aircraft of claim 9, wherein the instructions when executed cause the controller to control the fluid source to provide the fluid to the nozzles below a predetermined altitude value, and not provide fluid to the nozzles above the predetermined altitude value.

11. The aircraft of claim 10, wherein a portion of the ascent segment and a portion of the descent segment are below the predetermined altitude value.

12. The aircraft of claim 9, wherein the ejection centerline of each nozzle is pivotable to inject the fluid in a direction that is between the forward first direction and the radial second direction.

13. The aircraft of claim 9, wherein the plurality of nozzles includes at least one aft oriented nozzle that has an aft oriented nozzle ejection centerline, and the aft oriented nozzle ejection centerline is oriented to inject the fluid in an aft direction at an acute angle relative to a radial line extending perpendicular to the axial centerline.

14. The aircraft of claim 13, wherein the acute angle is no greater than seventy degrees.

15. The aircraft of claim 9, wherein the plurality of nozzles are spaced apart from one another around a circumference of the nacelle inlet cavity and are disposed in a lower circumferential half of the nacelle inlet cavity.

16. The aircraft of claim 9, wherein the plurality of nozzles are circumferentially spaced apart from one another and are disposed in a lower circumferential half of the nacelle inlet cavity and in an upper circumferential half of the nacelle inlet cavity.

17. The aircraft of claim 9, wherein the plurality of nozzles includes a first subgroup of nozzles configured to inject the fluid into the air inlet path a first distance and a second subgroup of nozzles configured to inject the fluid into the air inlet path a second distance, wherein the first distance is greater than the second distance.

18. The aircraft of claim 9, wherein the pivotally mounted nozzles are controllable to pivot between a first positional orientation and a second positional orientation.

* * * * *